United States Patent [19]

Kunze

[11] Patent Number: 4,661,866

[45] Date of Patent: Apr. 28, 1987

[54] SWITCHING MECHANISM FOR THE TAPE DECK OF A MAGNETIC-TAPE-CASSETTE APPARATUS

[75] Inventor: Norbert Kunze, Ehringshausen, Fed. Rep. of Germany

[73] Assignee: U. S. Philips Corporation, New York, N.Y.

[21] Appl. No.: 741,054

[22] Filed: Jun. 5, 1985

[30] Foreign Application Priority Data

Jun. 15, 1984 [DE] Fed. Rep. of Germany ....... 3422259

[51] Int. Cl.$^4$ ...................... G11B 15/00; G11B 21/02
[52] U.S. Cl. .................................................. 360/96.1
[58] Field of Search ............... 360/93, 96.1, 96.3–96.5, 360/69, 90

[56] References Cited

U.S. PATENT DOCUMENTS 4,040,104 8/1977 Staar .................................. 360/96.1
4,450,491 5/1984 Takagi et al. ...................... 360/96.5
4,570,190 2/1986 Kitoh ................................ 360/93 X Primary Examiner—John H. Wolff
Attorney, Agent, or Firm—David R. Treacy

[57] ABSTRACT

A head-mounting plate can be moved forwards and backwards relative to a magnetic tape to be scanned, is latched in the operating position by a first latching mechanism, and can be moved back to an inoperative position under spring force when the first latching mechanism is released. An actuating rod, for actuation of tape deck function, can be latched in the actuated position by means of a second latching mechanism. The two latching mechanisms can be latched independently of each other, and each consist of mechanical parts only, which can be coupled to each other during latching. When the latching mechanisms are coupled to each other the second latching mechanism is released when the head mounting plate is released under the influence of the spring which returns the head mounting plate.

10 Claims, 8 Drawing Figures

SWITCHING MECHANISM FOR THE TAPE DECK OF A MAGNETIC-TAPE-CASSETTE APPARATUS

BACKGROUND OF THE INVENTION

The invention relates to a switching mechanism for the tape deck of a magnetic-tape-cassette apparatus comprising a head-mounting plate, which can be moved towards and away from a magnetic tape to be scanned, which plate is latched in the advanced operating position by a first latching mechanism and after release of the first latching mechanism can return to a rest position under spring force, and an actuating rod for the actuation of a tape-deck function, which rod can be latched in the actuated position by means of a second latching mechanism, which two latching mechanism can be latched separately and independently of each other.

Such a switching mechanism is described in EP-OS No. 00 72 586 to which U.S. Pat. Nos. 4,561,030 and 4,611,258 correspond. In this known switching mechanism the latching mechanism operates by means of electromagnets, which are controlled electrically and which remain latched as long as the electromagnets are energized. The electromagnets and the switching devices necessary for controlling these magnets are intricate, generate heat and are relatively bulky. In particular in the case of automative equipment it is essential to minimize the heat developed inside the apparatus and to make the individual functional parts as simple and as small as possible.

SUMMARY OF THE INVENTION

It is the object of the invention to improve a switching mechanism of the type specified in the opening paragraph in such a way that the two latching mechanisms are latched and released mechanically, the co-operation between the two latching mechanisms being such that if both latching mechanisms are latched they can be released jointly.

According to the invention this object is achieved in that
   the two latching mechanisms, which are constructed by means of mechanical parts, can be coupled to each other when they are released, and
   when the two latching mechanisms are coupled to each other the second latching mechanism is released during the return of the head-mounting plate under the influence of the spring of the head-mounting plate.

As a result of the entirely mechanical construction of the latching mechanisms they can be simple and small and they can be mass-produced, for example from a plastics. Moreover, no heat is produced during operation.

If the two latching mechanisms are latched when the end of the tape is reached, the mechanical coupling enables the second latching mechanism for the tape-deck function to be simply released at the same time as the head-mounting plate which is kept in the advanced operating position by the first latching mechanism. This ensures that always a stand-by position of the tape deck is reached, in which the head-mounting plate is retracted, the pressure roller is lifted off the capstan and the tape-deck functions are stopped.

In a further embodiment of the invention the two latching mechanisms comprise movable first and second latching arms for the first and the second latching mechanism respectively, the second latching arm being co-operable with the first latching arm to release the second latching mechanism by giving the two latching mechanisms suitable geometries. This enables the two latching mechanisms to be latched, to be released and to be coupled to each other in a very simple manner.

In another embodiment of the invention the two latching arms can be pivoted out of their latched positions against spring force. In this way the latching arms are automatically relaxed and disengaged from each other after the release.

In yet another embodiment of the invention the second latching arm forms part of a sngle or multi-arm pivotal lever, one arm of said lever being an elastic arm. In this way the second-latching device may simply be constituted by a one-piece injection-moulded part, which on its own can perform the latching function and which can pivot out of the latched position when another actuating rod is pressed inwards.

In still another embodiment of the invention the first latching arm comprises two noses, which are each separately co-operable with a transport lever to move the second latching arm during different functional cycles of the tape deck. This enables the second latching mechanism to be released either via one nose or the other nose during different functional cycles in which the head-mounting plate is retracted. Of the two relevant functional cycles the first cycle ensures that the first latching mechanism is released when the end of tape is reached and the second functional cycle may occur when the actuating rod for the step function is pressed inwards.

In a further embodiment of the invention the transport lever comprises two projections, which are co-operable with the first nose and the second nose respectively, during diffent functional cycles of the tape deck. Thus, the two projections initiate the release process during the two functional cycles by their co-operation with the two noses.

In order to carry out the function cycles for the release operation, the first latching arm is pivotally mounted on a pivotal lever, which can be pivoted by an actuating slide, the pivotal movement of the pivotal lever causing the first nose on the first latching arm to be moved out of the area where it can co-operate with the first projection on the transport lever to release the first latching mechanism, so that the second nose is made to co-operate with the second projection on the transport lever. Further, the first projection may be a heart-shaped projection around which the first nose on the first latching arm can travel, and when the first nose is disengaged from the heart-shaped projection it abuts against a protruding portion on the first projection, which results in a pivotal movement of the first latching arm.

In a further embodiment of the invention the pivotal lever carries a first positioning element which is co-operable with a second positioning element arranged on an actuating slide, which positioning elements as they cooperate prevent the second latching mechanism from being latched, or release the second latching mechanism independently of the first latching mechanism. Thus, in addition to the first possibility of releasing the second latching mechanism, it is also possible to release this mechanism independently of the latching condition of the first latching mechanism.

An embodiment of the invention will be described in more detail, by way of example, with reference to the accompanying drawings.

DESCRIPTION OF THE PREFERRED EMBODIMENT

Figure 1:
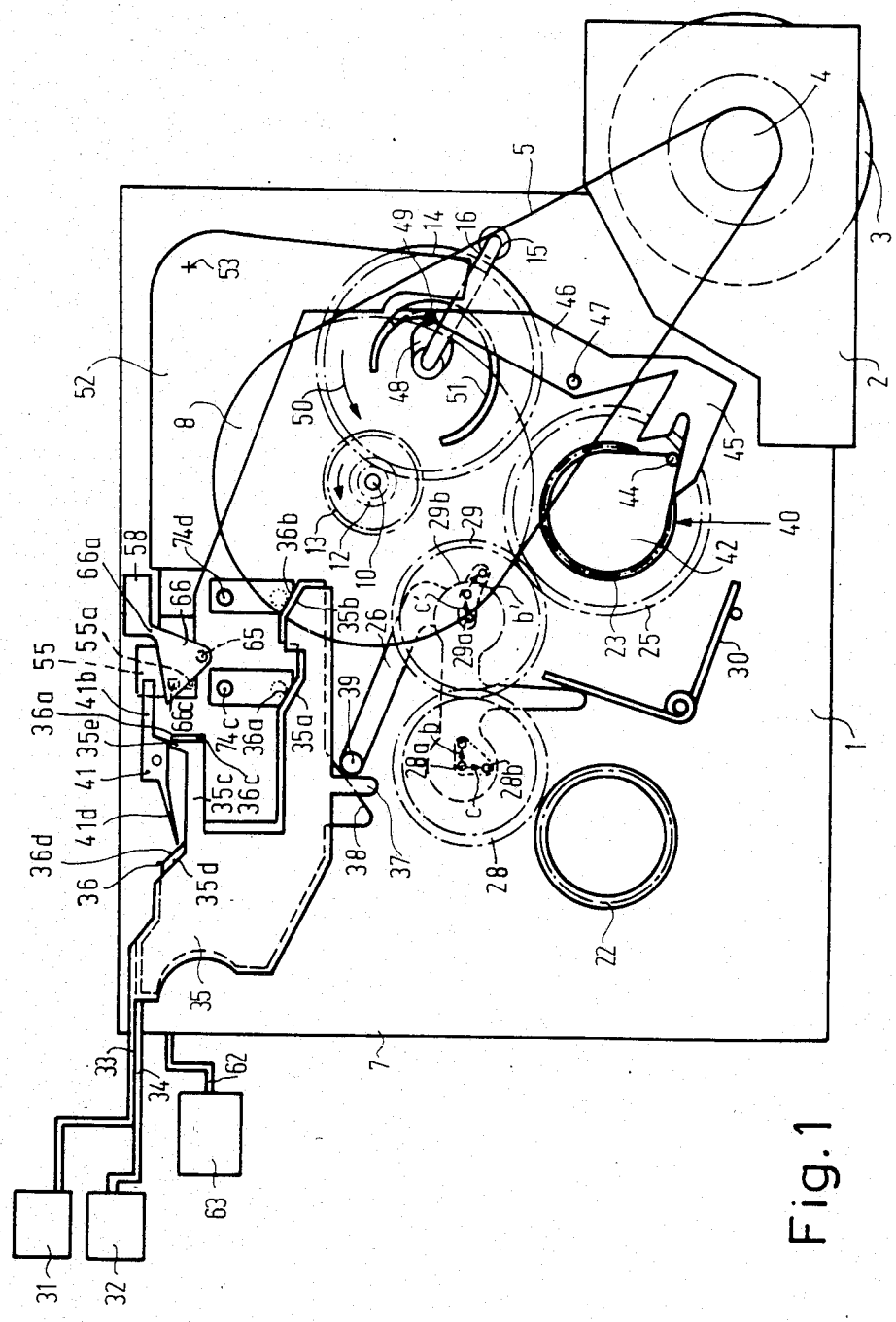
FIG. 1 is a plan view showing the magnetic-tape-cassette apparatus from the driving side.

The magnetic-tape-cassette apparatus shown in FIG. 1 comprises a deck plate 1 which carries a non-reversible drive motor 3 via a support 2. The drive pinion 4 of the motor 3 guides a belt 5, which is passed along a flywheel 8, in such a way that the flywheels rotate in opposite direction. The flywheel 8 is rotatably journalled in the deck plate 1 and is rigidly connected to a capstan 10. Moreover, the flywheel 8 is connected to a gear wheel 12. Via a slipping clutch a further gear wheel 13, which is coaxial with the gear wheel 12, is rotatable relative to the flywheel 8. A switching wheel 14 in the form of a gear wheel is constantly in mesh with the gear wheel 12 on the flywheel 8. This gear wheel 14 is arranged to be pivotable about a spindle 15. The spindle 15 carries a pivotal arm 16, shown schematically in FIG. 1, on which the switching wheel 14 is mounted for rotation.

Figure 4:
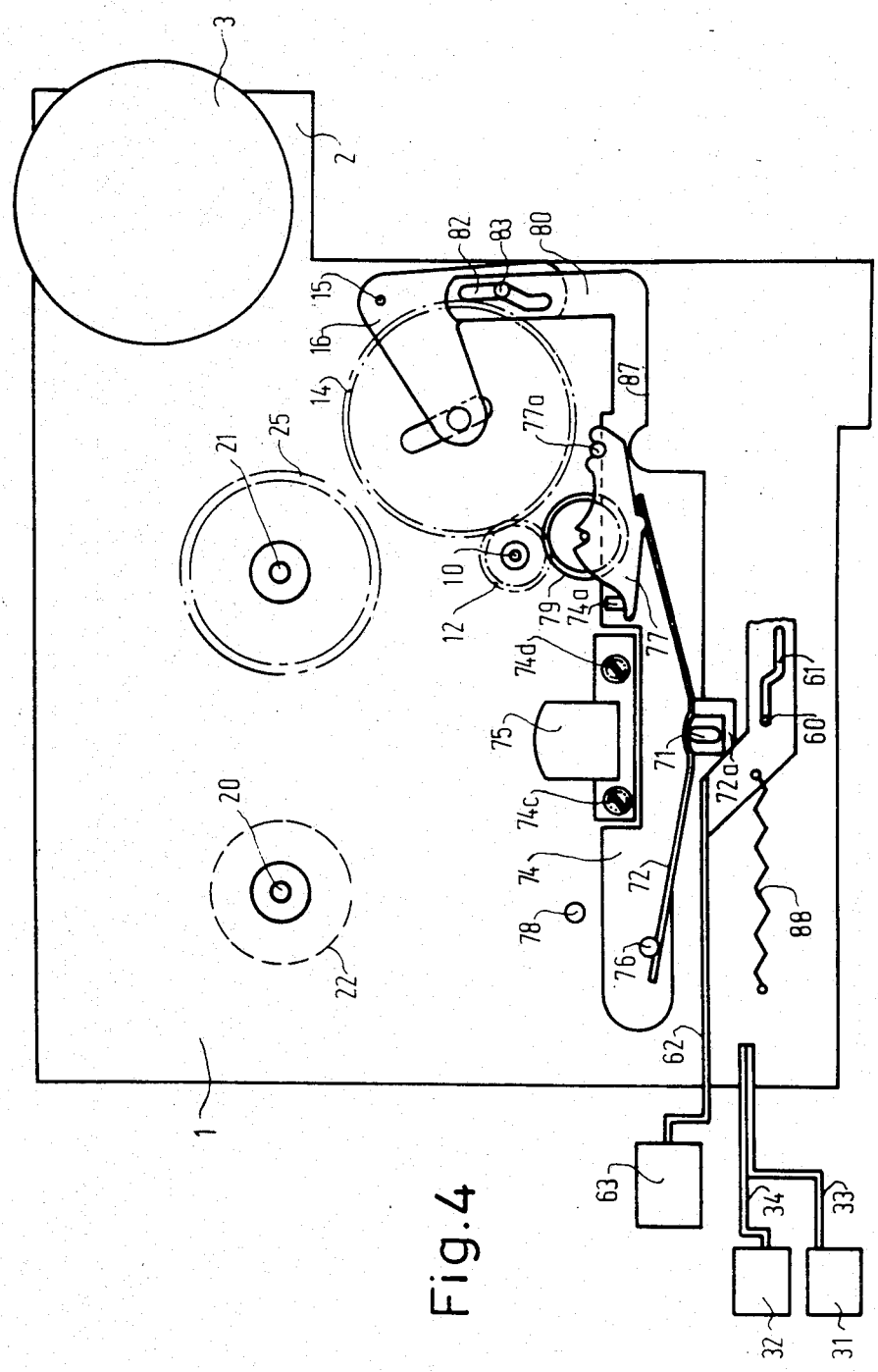
FIG. 4 is a plan view of the magnetic-tape-cassette apparatus seen at the sound-head side with the cassette removed.
Figure 5:
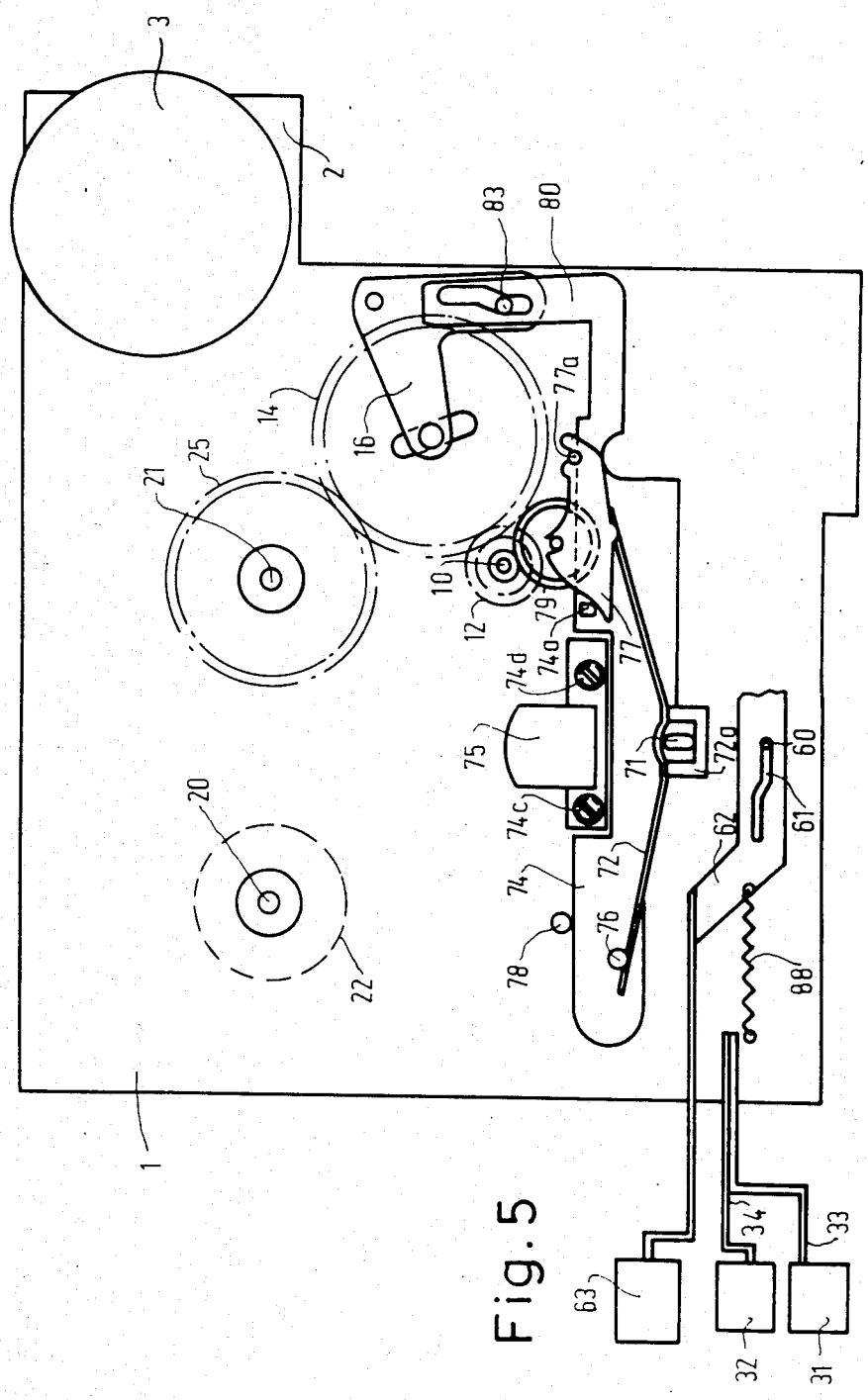
FIG. 5 shows the magnetic-tape-cassette apparatus with the head-mounting plate in the operating position.

As is also shown in FIGS. 4 and 5, winding spindles 20 and 21 are rotatably journalled in the deck plate 1. These winding spindles 20 and 21 are rigidly connected to fast-wind wheels 22, 23. Via a slipping clutch a play wheel 25 is coupled to the winding spindle 21.

FIG. 5 shows how the play wheel 25 is driven by the gear wheel 12 via the switching wheel 14.

A member 26, which is movably guided in the deck plate 1, carries two gear wheels 28, 29 adjacent each other (see FIG. 1). A spring 30 urges the member 26 towards the initial position shown in FIG. 1.

The member 26 carries two pins 28a and 29a, which are movably guided in a triangular hole 28b and a slot 29b, respectively, in the deck plate 1.

For fast forward and reverse winding there are provided two buttons 31 and 32. These buttons 31, 32 are connected to slides 35, 36 via push-button rods 33 and 34. These slides 35, 36 cooperate with the member 26. For this purpose the slide 35 is formed with a projection 37 and the slide 36 is formed with a guide surface 38. The projection 37 and the guide surface 38 cooperate with a pin 39 on the member 26. The slides 35, 36 further comprise guide surfaces 35a, 35b and 36a, 36b, respectively, which can cooperate with pins 74c, 74d of a head plate 74 (FIGS. 1, 4 and 5).

Figure 2A:
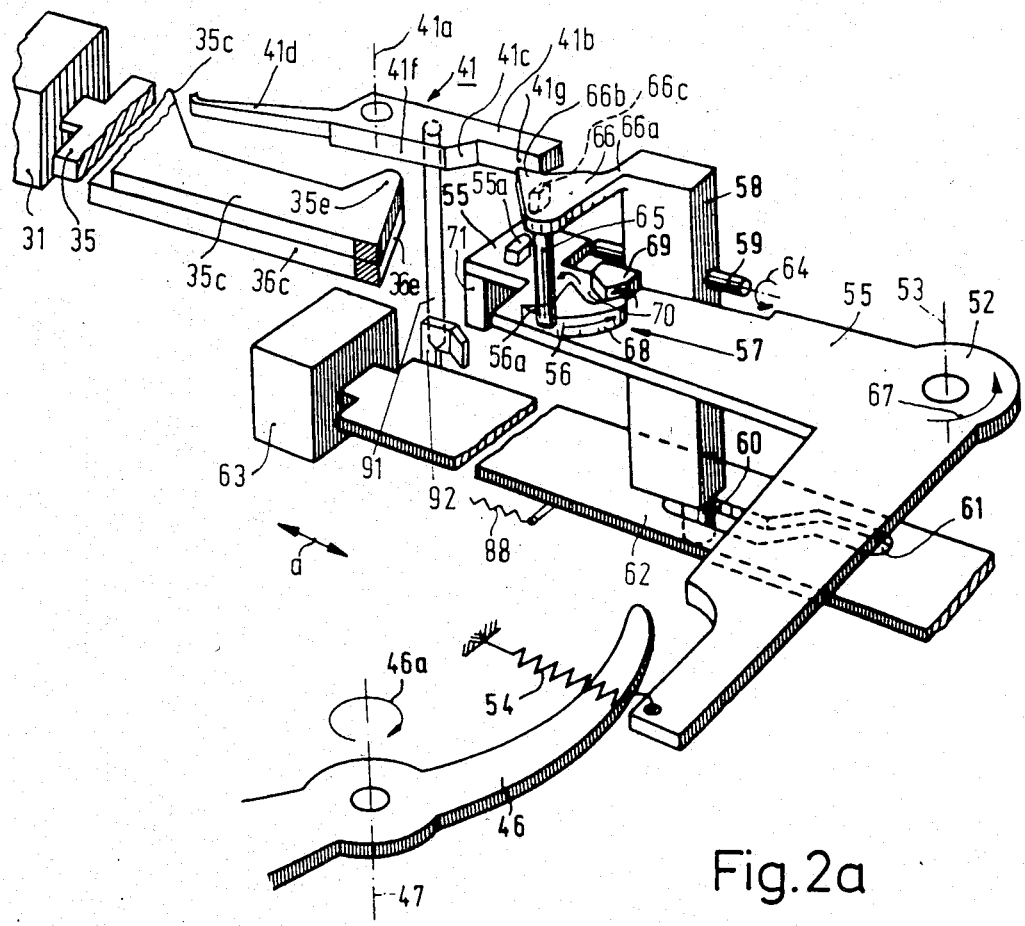
FIG. 2a is an enlarged-scale perpsective view of the switching mechanism when the cassette has been ejected and the latching mechanisms are released.
Figure 2B:
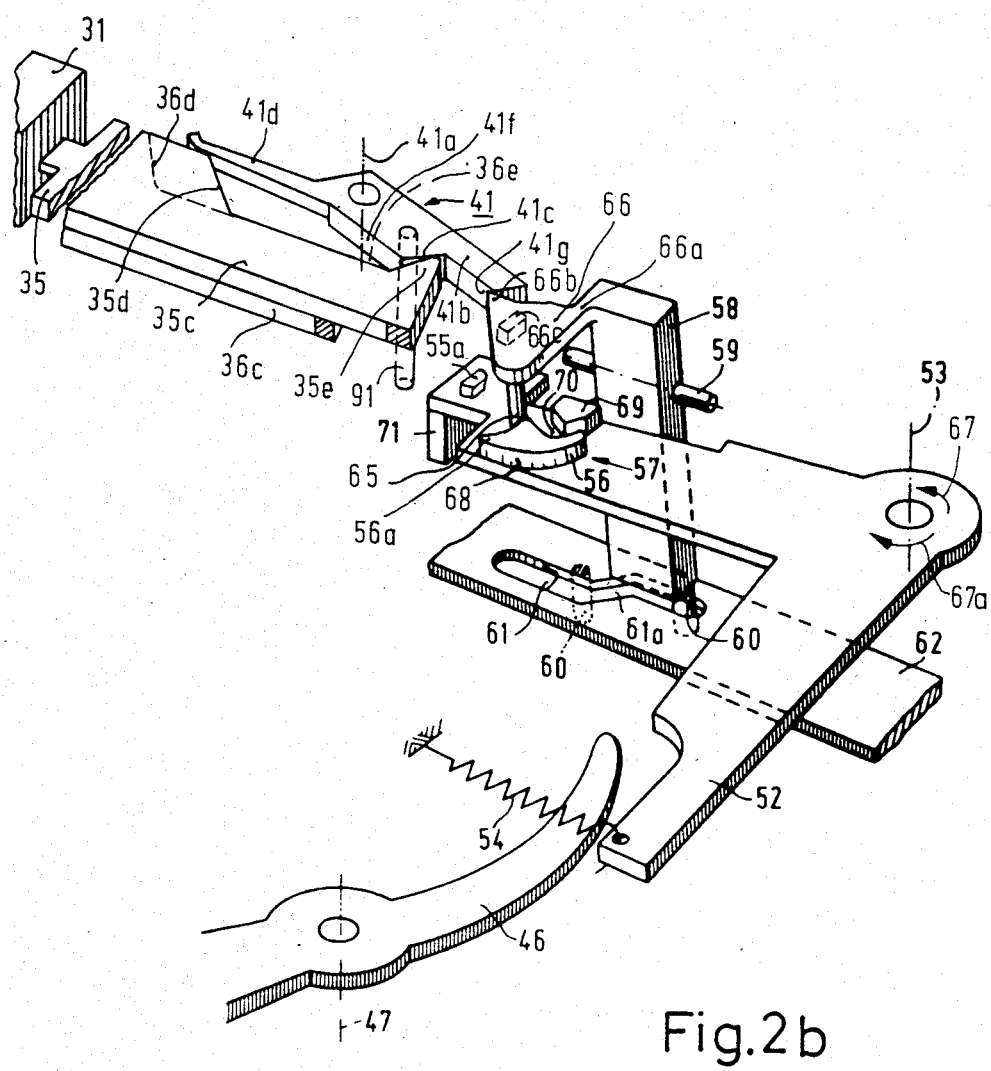
FIG. 2b is a perspective view of the switching mechanism in a position in which the second latching mechanism is still latched and the first latching mechanism is in the process of being released because the end of tape is reached.
Figure 2C:
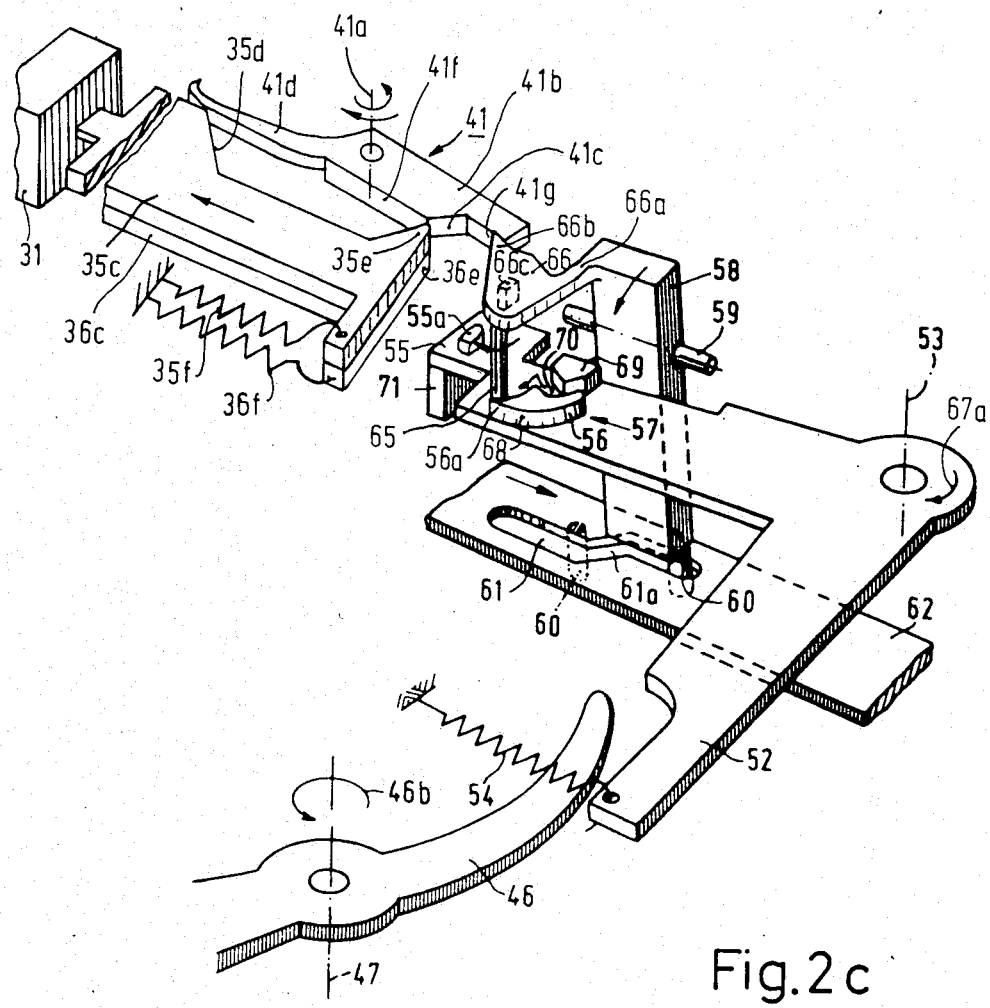
FIG. 2c is a perspective view of the switching mechanism, showing the first latching mechanism in a position in which it has just been released and has moved so far that it is about to release the second latching mechanism.
Figure 3A:
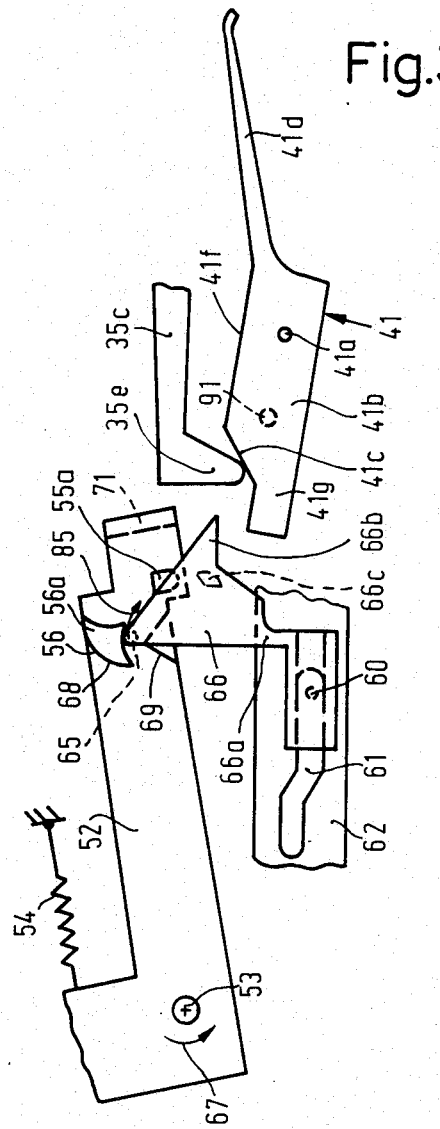
FIG. 3a shows schematically the switching mechanism in which the two latching mechanisms are latched.

The slides 35, 36 can each be latched in the slidin position (see FIGS. 2b and 3a). The slides 35, 36 carry latching elements 35c, 36c. These latching elements 35c, 36c each have oblique guide surfaces 35d, 36d and, spaced therefrom, latching noses 35e, 36e. Since the two latching elements 35c and 36c are identical, only the operation of the element 35c will be described hereinafter. By means of springs 35f and 36f (FIG. 2c) the two slides 35 and 36 are urged into their initial positions when they are not latched. Latching of the slides 35, 36 is effected by a common two-arm lever 41 which is pivotable about an axis 41. The lever 41, which is preferably made of a plastic, comprises a latching arm 41b with an oblique edge 41c behind which the two latching noses 35e and 36e can engage. The other arm 41d of the lever 41 is resiliently flexible and co-operates with the oblique guide surfaces 35d and 36d of the slides 35, 36. When one of the slides 35, 36, for example the slide 35, is pressed inwards the guide surface 35d of the slide 35 presses the resilient arm 41d sideways in such a way that the latching arm 41b is pivoted clockwise about the axis 41a. The latching nose 35e then engages behind the oblique surface 41c and the slide 35 is latched only by means of the lever 41. If unlatching is required, the other slide 36 is pushed inwards and the oblique surface 36d of the slide 36 presses the latching nose 36e of the slide 36 against a side wall 41f of the lever 41. As a result of this, the resilient arm 41d is deflected further than previously and the latching nose 36e presses the latching arm 41b so far counterclockwise that the latching nose 35e is disengaged from the surface 41c. The two slides are subsequently urged outwards into their initial positions by means of the springs 35f and 36f.

The latching arm 41b carries a coupling projection 41g, whose function will be explained hereinafter.

When as a result of the depression of the fastwind button 31 the projection 37 is urged against the pin 39 on the member 26, the gear wheel 29 first comes into mesh with the gear wheel 13. The pins 28a and 29a then move in the directions indicated by the arrows b and c', respectively. As the movement continues, the pin 29a moves further in the direction indicated by the arrow b', as a result of which the gear wheel 29 also meshes with the gear wheel 23. The magnetic tape is now wound rapidly by the winding spindle 21. If the other fastwind button 32 is depressed the guide surface 38 cooperates with the pin 39 on the member 26. The pins 28a and 29a then move in the directions indicated by the arrows c and c' respectively, so that the gear wheel 29 meshes with the gear wheel 13 and the gear wheel 28 meshes with the gear wheel 22. In this way the other winding spindle 20 is now driven for fast winding.

When the head-mounting plate 74 has reached a playing position (operating position), the pins 74c, 74d assume one of the broken-line-positions shown in FIG. 1. The positions correspond to the positions shown in FIG. 5. Actuating the push-button rods 33 and 34, has the result that via the guide surfaces 35a, 35b and 36a, 36b, respectively, the pins 74c, 74d and hence the head-mounting plate 74 are moved upwards so that a sound head 75 and pressure rollers 78, 79 are lifted off the magnetic tape during fast winding.

A detection means 40, comprising a disc 42 is connected to the winding spindles 21 via a slipping clutch. A pin 44 arranged on the disc 42 engages with a switching fork 45. The switching form 45 is arranged on a switching member 46, which is pivotable about a pivot 47 (see also FIGS. 2a, 2b and 2c). The switching wheel 14 carries a central slightly elliptical projection 48. The switching member 46 extends over the switching wheel 14 and carries a pin 49 which, when the switching member 46 has pivoted inwards, slides over the circumference of the projection 48 when the switching wheel is rotated in the direction indicated by an arrow 50. Around the projection 48 a spiral guide wall 51 is formed on the switching wheel 14 at a larger distance. This guide wall 51 can also cooperate with the pin 49 on the switching member 46 when the detection means 40 detects tape stoppage. The pin 44 then no longer presses against the switching fork 45, so that the pin 49 on the switching member 46 is no longer moved inwards towards the projection 48 but remains in the same position and, as the switching wheel 14 continues to rotate in the direction indicated by the arrow 50, reaches the outer side of the guide wall 51. Since the guide wall 51 is spiral-shaped the switching member 46 will be pivoted clockwise about its pivot 47, so that the switching member 46 is urged against a connecting member 52. The switching member 46 is then pivoted in the direction indicated by the arrow 46a (FIG. 2a).

The connecting member 52 is a lever having two arms, which lever is pivotable about a pivot 53. As can be seen in FIGS. 2a, 2b and 2c, the connecting member 52 is spring-biased in the clockwise direction by a spring 54. Thus, the movement of the switching member 46 tensions the spring 54.

The lever arm 55 of the connecting member 52, which is remote from the point of engagement with the switching member 46, carries a heart-shaped projection 56 which forms part of a latching mechanism 57. The latching mechanism 57 also comprises a latching lever 58, which can be pivoted about a spindle 59. The spindle 59 extends parallel to the upper surface of the dark plate 1. The latching lever 58 carries a guide pin 60 on its side which faces the heart-shaped projection 56, which pin extends through a guide slot 61 in an actuating slide or rod 62 of a stop/eject button 63. The direction of movement of the rod 62 extends parallel to the spindle 59 and the rod 62 is urged outwards by a tension spring 88 (FIGS. 4, 5). The guide slot 61 has such a shape that during the movement from the position of FIG. 2a to that of FIG. 2b (outward movement of the rod 62) the latching lever 58 is pivoted about the spindle 59 in the direction indicated by an arrow 64, so that a latching pin 65 is lowered to the level of the projection 56 and can be moved thereby. The outward movement of the stop/eject button 63 and the rod 62 is obtained in a manner, not shown, by inserting a magnetic tape cassette into the apparatus.

FIG. 2a shows the rod 62 in the inward position and FIGS. 2b and 2c show the rod 62 in the outward position.

Via an integral hinge 66 the latching lever 58 carries a latching arm, which carries a latching pin 65. This pin 65 can engage with a travel around the heart-shaped projection 56. In FIG. 2a (corresponding to the position of the rod 62 in FIGS. 1 and 4) the pin 65 which constitutes a first nose is situated about the heart-shaped first projection 56, because the rod 62 is depressed. When the actuating rod 62 has moved outwards (see FIG. 5) the pin 65 can cooperate with the heart-shaped projection 56. The pin 65 can move along a side wall 68 of the heart-shaped projection 56 when the switching member 46 pivots the connecting member 52 in the counter-clockwise direction indicated by an arrow 67 (as shown in FIG. 2b). A guide 69 ensures that the pin 65 engages in a recess 70 in the heart-shaped projection 56 (FIG. 3a).

The lever arm 55 carries a limb 71. As can be seen in FIGS. 4 and 5, this limb 71 cooperates with a blade spring 72 and a portion 72a of this spring 72 and extends through a slot 73 in the deck plate 1. With its free ends the blade spring 72 acts against a member 77 which is pivotable about a spindle 77a on the head-mounting plate 74. The other free end presses against a pin 76 on the head-mounting plate 74. In its center this head-mounting plate 74 carries a sound head 75, and on the right of the sound head 75 the member 77 in which a pressure roller 79 is journalled. The member 77 is urged against a stop 74a on the head-mounting plate 74 in the withdrawn position of the plate 74.

The head-mounting plate 74 has angular end-portion 80. The end portion 80 is formed with a slot 82, in which a pin 83 is movable, which pin is mounted on the pivotal arm 16. Thus, in the position shown in FIG. 5, the pivotal arm 16 has pivoted about the spindle 15 in such a manner that the switching wheel 14 is in mesh with the play wheel 25 and the gear wheel 12. In the position shown in FIG. 5 the pressure roller 79 is urged against the capstan 10 and the member 77 is then disengaged from the stop 74a.

The magnetic-tape cassette apparatus operates as follows. When a cassette is inserted the rod 62 moves from the position shown in FIGS. 2a and 4 to the position shown in FIGS. 2b and 5. This is the position of the rod 62 shown in FIGS. 3 and 4. As a result of this a drive, switch, not shown, is closed, so that the control drive motor is started. At the same time the gear wheel 12 is rotated, so that the gear wheel 14 is also rotated.

As a result of the movement of the actuating rod 62 (from the position of FIG. 2a to the position in FIG. 2b) the latching lever 58 (FIG. 2a) is pivoted about the spindle 59, and the latching pin 65 is positioned in the area of engagement with the heart-shaped projection 56.

As the gear wheel 14 is not in mesh with the gear wheel 25, the winding spindle 12 is not driven. The disc 42 (FIG. 1) is coupled to the winding spindle 21 via a separate slipping clutch and is therefore also stationary. Since no torque is exerted on the switching member 46 when the cassette is inserted, because the reels do not rotate and there is no tape transport, the switching member 46 remains in the position shown in FIG. 1 and the pin 49 is moved against the outer side of the guide wall 1. As a result of this, the switching member 46 is moved in a clockwise direction, as indicated by the arrow 46a in FIG. 2a, and the connecting member 52 is pivoted counterclockwise (as indicated by the arrow 67). Since the latching lever 58 has pivoted and the pin 65 is positioned in the area of engagement with the heart-shaped projection 56, the pin 65 now travels along the wall 68 of the heart-shaped projection 56 and engages the recess 70. Thus, the connecting member is latched in a pivotal position (see FIG. 3a). Owing to the pivotal movement of the connecting member 52 in the counterclockwise direction indicated by the arrow 67, the limb 71 has moved inwards and is urged against the blade spring 72. The blade spring 72 in its turn acts aginst the head-mounting plate 74 via the members 77 and the pin 76 and tends to urge this plate towards the capstan 10. In the play or operating position the pressure roller 79 is positioned against the capstan 10. Moreover, the head-mounting plate 74 abuts against a stop pin 78 (FIG. 5). This is the play position of the head-mounting plate in which the magnetic tape is moved past the head 75 when the motor 3 is running.

When the end of the tape is reached the tape stops. As a result of this, the switching member 46 with the pin 49 is again pivoted in the clockwise direction (arrow 46a). The connecting member 52 is again pivoted counter-clockwise (FIG. 3a) in the direction indicated by the arrow 67. During this movement the connecting number 52 is pivoted beyond the normal travel obtained when it is in its latched position. This overtravel is possible because the limb 71 acts against the blade spring 72 on the head-mounting plate 74 via the pin 76 and member 77. Thus the limb 71 has room for a movement towards the head-mounting plate 74. During this overtravel the pin 65 leaves the recess 70 in the direction indicated by the arrow 85 and the latching mechanism 57 is released. The guide wall 51 now releases the pin 49, so that the switching member 46 can return in the direction indicated by the arrow 46b in FIG. 2c. Under the influence of the spring 54 the connecting member 52 can then be pivoted in the direction indicated by the arrow 67a (FIG. 2c). As the pin 63 engages the heart-shaped projection 56 the latching arm 66 is pivoted further clockwise (in the direction indicated by the arrow 85 in FIG. 3a) by a projection 56a against the force exerted by the integral hinge of the heart-shaped projection 56, so that the nose 66b pushes away the coupling projection 41g when the second latching mechanism is in the latched position. The accompanying pivotal movement of the pivotal lever 41 releases the latching nose 35e or 36e to unlatch the corresponding actuating rod 35 or 36.

At the same time the limb 71 moves outwards to withdraw the head-mounting plate. The switch, not shown, is then opened and the motor 3 is stopped.

If the head-mounting plate 74 is in the player operating position and fast-winding is desired, one of the buttons 31 or 32 is depressed. As described already, this button is latched in the depressed position by means of the second latching arm 41b. The winding spindle 20 or 21 is then rotated rapidly in the manner described. How this fast-winding operation can be terminated independently of the first latching device in a first manner has been described already, namely in that the other button 32 or 31 is depressed, so that both buttons are released. As the head-mounting plate is still latched in the play or operating position via the heart-shaped projection 57, the fastwinding operation is terminated and the normal playing operation is continued.

However, if during fast winding the end of the tape is reached the release of the first latching device, comprising the heart-shaped projection 57, the pin 65 and the latching arm 66, is initiated via the switching member 46 and the connecting member 52, which is used as a transport lever, in accordance with a second release possibility in the manner already described. The second latching mechanism is then released in a manner which has also been described already. Thus, when the end of tape is reached the first latching mechanism releases the second latching mechanism, which comprises the latching noses 35e, 36e and the latching arm 41b. This ensures that even when the fast-wind buttons 31, 32 are depressed these buttons are always released if at the end of the tape the first latching mechanism is released and, consequently, the head-mounting plate can move back.

Figure 3B:
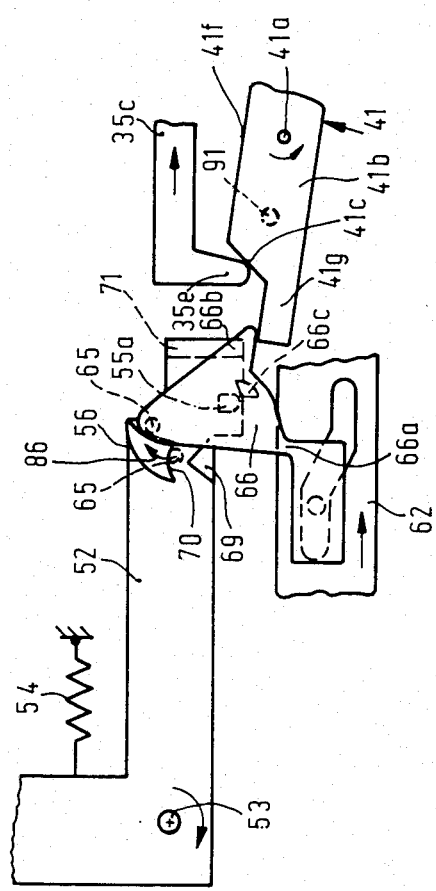
FIG. 3b shows schematically the switching mechanism when the first latching mechanism is already released and is about to release the second latching mechanism in a different manner.

A third possibility of releasing the buttons 31 and 32 is obtained when the actuating slide 62 is pressed inwards in the latched position of the head-mounting plate 74. The pin 60 then assumes the position shown in broken lines in FIGS. 2b and 2c. The lever 58 is pivoted clockwise about the spindle 59 and the pin 65 leaves the heart-shaped projection 56. The pin 65 is then lifted out of the area in which it can co-operate with the heart-shaped projection 56. The disengagement of the pin 65 results in the transport lever 52 being pivoted clockwise (arrow 67a) about the axis 53 by means of the spring 54. The lever arm 55 has a second projection 55a which is moved towards a second nose 66c as a result of the pivotal movement of the connecting member 52, which second nose is arranged on the lower side of the first latching arm 66. The projection 55a then abuts against the nose 66c and pivots the latching arm 66 clockwise (FIG. 3b). The relative movement between the heart-shaped projection 56 and the latching pin 65 is represented by the arrow 86 in FIG. 3b. The tip 66b then abuts against the coupling projection 41g and the latching arm 41b is pivoted counterclockwise about the axis 41a as shown in FIG. 3b. The relevant button 31 or 32 is then released. Depression of the stop button 63 thus only results in both latching mechanisms being released, all the buttons being released and the head-mounting plate 74 being withdrawn. In this position the tape transport has stopped and in a tape deck without automatic reverse facility the apparatus is set to stand-by in a manner as described for end of tape in accordance with the second release possibility described above.

In order to obtain a fourth release possibility the pivotal lever 41 carries a pin 91 as the first positioning element. This pin 91 co-operates with a second positioning element 92, which is secured to the actuating slide 61. If the actuating slide 62 is moved inwards the element 92 is pressed against the pin 91, so that the pivotal lever 41, if the second latching mechanism is in the latched position, effects a pivotal movement which results in unlatching. Thus, the second latching mechanism, in addition to the first release possibility, has a further release possibility which is independent of the latching condition of the first latching mechanism. In this way it is possible to set the apparatus to winding with the head-mounting plate withdrawn (stand-by position).

What is claimed is:

1. A switching mechanism for the tape deck of a magnetic-tape-cassette apparatus comprising a head-mounting plate, which can be moved towards and away from a magnetic tape to be scanned, which plate is latched in the advanced operating position by a first latching mechanism and after release of the first latching mechanism can return to a rest position under spring force, and an actuating rod for the actuation of a tape-deck function, which rod can be latched in the actuated position by means of a second latching mechanism, which two latching mechanisms can be latched separately and independently of each other, characterized in that the two latching mechanisms (first latching mechanism; second latching mechanism), which are constructed by means of mechanical parts, can be coupled to each other when they are released, and when the two latching mechanisms are coupled to each other the second latching mechanism is released during the return of the head-mounting plate under the influence of the spring of the head-mounting plate.

2. A switching mechanism as claimed in claim 1, characterized in that the two latching mechanisms comprise movable first and second latching arms for the respective latching mechanisms, the second latching arm being co-operable with the first latching arm to release the second latching mechanism by giving the two latching mechanisms suitable geometries.

3. A switching mechanism as claimed in claim 2, characterized in that the two latching arms can be pivoted out of their latched positions against spring force.

4. A switching mechanism as claimed in claim 3, characterized in that the second latching arm forms part of a single or multi-arm pivotal lever, the other arm of the pivotal lever being an elastic arm.

5. A switching mechanism as claimed in claims 1 to 3, characterized in that the first latching arm comprises two noses, which are each separately co-operable with a transport lever to move the second latching arm during different functional cycles of the tape deck.

6. A switching mechanism as claimed in claim 5, characterized in that the transport lever comprises two projections, which are co-operable with the first nose and the second nose respectively, during different functional cycles of the tape deck.

7. A switching mechanism as claimed in claim 6, characterized in that the first latching arm is pivotally mounted on a pivotal lever, which can be pivoted by an actuating slide, the pivotal movement of the pivotal lever causing the first nose on the first latching arm to be moved out of the area where it can co-operate with the first projection on the transport lever to release the first latching mechanism, so that the second nose is made to co-operate with the second projection on the transport lever.

8. A switching mechanism as claimed in claim 6, characterized in that the first projection is a heart-shaped projection around which the first nose of the first latching arm can travel and the first nose, when it leaves the heart-shaped projection, is actuated by a projection on the first projection, which results in a pivotal movement of the first latching arm.

9. A switching mechanism as claimed in claim 2, characterized by comprising two fast-wind buttons, means for causing fast winding of the tape in the forward or the reverse direction respectively responsive to movement of the respective button, and means for latching said buttons by the second latching arm.

10. A switching mechanism as claimed in claim 9, characterized in that the mechanism includes a first positioning element carried on said pivotal lever, an actuating slide, and a second positioning element arranged on said actuating slide, and said positioning elements are arranged to cooperate so as to prevent the second latching mechanism from being latched or to release the second latching mechanism independently of the first latching mechanism.

* * * * *